United States Patent
Keitoku et al.

(10) Patent No.: US 6,239,249 B1
(45) Date of Patent: *May 29, 2001

(54) METHOD FOR PRODUCING A COPOLYMERIZED POLYESTER RESIN

(75) Inventors: Fumio Keitoku; Hisashi Kimura; Toshio Kanbe; Koichi Ikeyama, all of Mie (JP)

(73) Assignee: Mitsubishi Chemical Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,671

(22) Filed: Feb. 22, 2000

(30) Foreign Application Priority Data

Feb. 23, 1999 (JP) .................................................. 11-044248

(51) Int. Cl.$^7$ ..................................................... C08G 63/02
(52) U.S. Cl. .......................... 528/194; 528/195; 528/206; 528/272; 528/286; 528/302; 528/308; 528/308.6
(58) Field of Search ..................................... 528/194, 195, 528/206, 272, 286, 302, 308, 308.6

(56) References Cited

U.S. PATENT DOCUMENTS

| 4,440,922 | * | 4/1984 | Barbee et al. | 528/194 |
| 4,552,948 | | 11/1985 | Barbee et al. | 528/194 |
| 4,959,421 | * | 9/1990 | Hirahara et al. | 525/437 |
| 5,030,705 | * | 7/1991 | Hirahara et al. | 528/176 |
| 5,239,045 | * | 8/1993 | Hirahara et al. | 528/272 |

* cited by examiner

Primary Examiner—Samuel A. Acquah
(74) Attorney, Agent, or Firm—Oblon, Spivak, McClelland, Maier & Neustadt, P.C.

(57) ABSTRACT

A method for producing a copolymerized polyester resin, which comprises subjecting a dicarboxylic acid component containing terephthalic acid or its ester derivative as the main component and a phenylene dioxydiacetic acid as a copolymerizable component, and a diol component containing ethylene glycol as the main component, to polycondensation through an esterification reaction or a transesterification reaction, wherein the phenylene dioxydiacetic acid is added to the reaction system in the form of a solution dissolved in the diol component.

11 Claims, No Drawings

METHOD FOR PRODUCING A COPOLYMERIZED POLYESTER RESIN

BACKGROUND OF THE INVENTION

1. Field of the Invention

The present invention relates to a method for producing a copolymerized polyester resin obtained by copolymerization of a dicarboxylic acid component to impart gas barrier properties.

2. Discussion of Background

Heretofore, an attention has been drawn to polyester resins represented by polyethylene terephthalate resins, in view of excellent mechanical properties and chemical properties, and besides, excellent transparency, gas barrier properties, safety and sanitation and the like. They have been used widely particularly in a food packaging field, as bottles obtained by stretch blow molding of an injection-molded perform, as trays or cups obtained by thermoforming of an extrusion-molded sheet, or as films obtained by biaxial stretching of said sheet.

However, although the gas barrier properties of polyester resins are excellent as compared with e.g. polyolefin resins and polystyrene resins which have been used widely in the food packaging field, the gas barrier properties of the polyester resins may not always be adequate for bottles for e.g. carbonated drinks and alcohol drinks, which require particularly strict barrier properties against e.g. oxygen gas and carbonic acid gas, and such a tendency is marked particularly for miniaturized bottles used in recent years.

On the other hand, for example, as a method to improve gas barrier properties of the polyethylene terephthalate resins, U.S. Pat. No. 4,440,922 (JP-A-60-501060) and U.S. Pat. No. 5,239,045 (JP-A-5-186570) disclose a method of copolymerizing a dicarboxylic acid component containing terephthalic acid or its ester derivative as the main component and a phenylene dioxydiacetic acid as a copolymerizable component, and a diol component containing ethylene glycol as the main component, wherein the phenylene dioxydiacetic acid is preliminarily added at the initiation of an esterification reaction or a transesterification reaction of terephthalic acid or its ester derivative with ethylene glycol for esterification reaction or transesterification reaction, followed by polycondensation, or the phenylene dioxydiacetic acid is added to an esterification reaction product or a transesterification reaction product of terephthalic acid or its ester derivative with ethylene glycol, followed by polycondensation.

However, according to the studies by the present inventors, it has been found that by the above-mentioned methods of adding the phenylene dioxydiacetic acid, the obtained copolymerized polyester resins tend to be slightly yellowed and be poor in color tone, and further, the copolymerization may not always be carried out stably, and accordingly, polyester resins having a stable quality can not be produced.

Further, it has been found that the phenylene dioxydiacetic acid to be used as the copolymerizable component is suscetible to heat deterioration, and it is likely to decompose or turn yellow due to heat history at the esterification reaction or the transesterification reaction or at the polycondensation reaction, and its heat resistance may decrease.

Further, it has been found that foreign substances are likely to be formed in the obtained copolymerized polyester resin, depending upon the time of addition of the phenylene dioxydiacetic acid, and such is problematic particularly as a material to be used in e.g. a food packaging field.

SUMMARY OF THE INVENTION

It is an object of the present invention to provide a method for producing a copolymerized polyester resin, in which a copolymerization of a dicarboxylic acid component to impart gas barrier properties can be carried out stably, whereby a polyester resin having a stable quality, in addition to excellent color tone, can be produced.

Further, it is an object of the present invention to provide a production method which reduces decrease in heat resistance and which reduces the formation of foreign substances.

The above-mentioned objects can be achieved by a method for producing a copolymerized polyester resin, which comprises subjecting a dicarboxylic acid component containing terephthalic acid or its ester derivative as the main component and a phenylene dioxydiacetic acid as a copolymerizable component, and a diol component containing ethylene glycol as the main component, to polycondensation through an esterification reaction or a transesterification reaction, wherein the phenylene dioxydiacetic acid is added to the reaction system in the form of a solution dissolved in the diol component.

DETAILED DESCRIPTION OF THE PREFERRED EMBODIMENTS

In the method for producing a copolymerized polyester resin of the present invention, the dicarboxylic acid component contains terephthalic acid or its alkyl (carbon number: a level of from 1 to 4) ester derivative as the main component, and the diol component contains ethylene glycol as the main component. As the ester derivative, specifically, dimethyl terephthalate or diethyl terephthalate may, for example, be mentioned.

In the present invention, preferably at least 80 mol %, more preferably at least 90 mol %, of the constitution repeating units are ethylene terephthalate units consisting of terephthalic acid or its ester derivative as the dicarboxylic acid component and ethylene glycol as the diol component. If the ethylene terephthalate units are less than 80 mol %, e.g. mechanical properties and heat resistance of the copolymerized polyester resin tend to be poor.

In the present invention, a phenylene dioxydiacetic acid is essential as the copolymerizable component in the dicarboxylic acid component, and the proportion of said phenylene dioxydiacetic acid is preferably from 0.1 to 20 mol %, more preferably from 0.2 to 10 mol %, and particularly preferably from 0.5 to 5 mol %, based on the total dicarboxylic acid component.

As the phenylene dioxydiacetic acid, specifically, 1,2-phenylene dioxydiacetic acid, 1,3-phenylene dioxydiacetic acid, 1,4-phenylene dioxydiacetic acid, 2-methyl-1,3-phenylene dioxydiacetic acid, 5-methyl-1,3-phenylene dioxydiacetic acid, 6-methyl-1,3-phenylene dioxydiacetic acid, 5-ethyl-1,3-phenylene dioxydiacetic acid, 6-ethyl-1,3-phenylene dioxydiacetic acid, 5-methoxy-1,3-phenylene dioxydiacetic acid, 6-methoxy-1,3-phenylene dioxydiacetic acid, 4-chloro-1,2-phenylene dioxydiacetic acid or 4-chloro-1,3-phenylene dioxydiacetic acid, or an ester derivative thereof, may, for example, be mentioned. Among these, preferred are 1,3-phenylene dioxydiacetic acid and its ester derivative.

Further, the phenylene dioxydiacetic acid to be used as the starting material in the present invention, has a content of monohydroxyphenylene oxyacetic acid of preferably at most 0.2 wt %, more preferably at most 0.15 wt %, particularly preferably at most 0.1 wt %, a content of phenylene dioxytriacetic acid of at most 1.0 wt %, more preferably at most 0.8 wt %, particularly preferably at most 0.5 wt %, and a transmittance of light having a wavelength of 400 nm of preferably at least 90%, more preferably at least 92%, as a 10 wt % aqueous alkali solution.

If the content of monophenylene dioxyacetic acid or phenylene dioxytriacetic acid exceeds the above-mentioned range, the obtained polyester resin tends to be poor in color tone and heat resistance. Further, if the transmittance of light exceeds the above-mentioned range, the color tone of the obtained polyester resin tends to decrease.

Here, the monohydroxyphenylene oxyacetic acid and the phenylene dioxytriacetic acid are present in the starting material phenylene dioxydiacetic acid as by-products in production of the phenylene dioxydiacetic acid as explained below.

The phenylene dioxydiacetic acid is usually produced in such a manner that a dihydroxybenzene such as resorcinol and monochloroacetic acid as starting materials are reacted in an aqueous alkali solution such as sodium hydroxide, potassium hydroxide, sodium carbonate or potassium carbonate, with a dihydroxybenzene concentration of a level of from 10 to 50 wt %, at a pH in the reaction system of a level of from 7.5 to 12, preferably a level of from 8 to 11, at a reaction temperature of a level of from 40 to 100°C., preferably a level of from 50 to 95° C., for a reaction time of a level of from 0.1 to 10 hours, preferably a level of from 1 to 7 hours, to obtain reaction solution containing an alkali salt of the phenylene dioxydiacetic acid, said reaction solution is gradually supplied to an aqueous mineral acid solution under heating with stirring, and stirring is continued for from about 0.5 to 2 hours to carry out oxidation treatment, and the reaction mixture is cooled to a level of at most 50°C., and the precipitated phenylene dioxydiacetic acid crystal is separated by solid-liquid separation, followed by purification by means of e.g. recrystallization with water or washing with water.

In the above-mentioned production process, the amount of the monochloroacetic acid is at least double molar quantity, preferably from 2.1 to 3 times the molar quantity, to the dihydroxybenzene. If the amount of monochloroacetic acid is less than the above-mentioned range, the formation amount of the monohydroxyphenylene oxyacetic acid tends to increase, and if it exceeds the above-mentioned range, the formation amount of the phenylene dioxytriacetic acid tends to increase.

The above-mentioned transmittance of light as a 10 wt % aqueous alkali solution, will be influenced by heat history in steps of reaction, purification and drying of the above-mentioned production process, and also by the above-mentioned purification method. The transmittance of light may decrease in some cases if the purification is repeated under heating to decrease the formation of the above-mentioned monohydroxyphenylene oxyacetic acid and phenylene dioxytriacetic acid, and accordingly, it is preferred to determine reaction and purification conditions, taking such into consideration.

In the case where, the phenylene dioxydiacetic acid to be used is 1,3-phenylene dioxydiacetic acid, the monohydroxyphenylene oxyacetic acid may, for example, be 2-(3-hydroxyphenoxy)acetic acid, and the phenylene dioxytriacetic acid may, for example, be 4-carboxymethyl- 1,3-phenylenebis(2-oxyacetic acid).

In the present invention, as the dicarboxylic acid component except for terephthalic acid or its ester derivative and phenylene dioxydiacetic acid, at least one of aromatic dicarboxylic acids such as phthalic acid, isophthalic acid, 4,4'-diphenyl dicarboxylic acid, 4,4'-diphenoxyethane dicarboxylic acid, 4,4"-diphenyl ether dicarboxylic acid, 4,4'-diphenyl sulfone dicarboxylic acid and 2,6-naphthalene dicarboxylic acid, alicyclic dicarboxylic acids such as hexahydroterephthalic acid and hexahydroisophthalic acid, and aliphatic dicarboxylic acids such as malonic acid, succinic acid, adipic acid, azelaic acid, sebacic acid and diglycolic acid, and ester derivatives thereof, may, for example, be used. As the diol component except for ethylene glycol, at least one of aliphatic diols such as propylene glycol, trimethylene glycol, tetramethylene glycol, pentamethylene glycol, hexamethylene glycol, decamethylene glycol, neopentyl glycol and dietylene glycol, alicyclic diols such as 1,2-cyclohexane diol, 1,1-cyclohexanedimethylol and 1,4-cyclohexanedimethylol, and aromatic diols such as pyrocatechol, resorcinolol, hydroquinone, 4,4-dihydroxybiphenyl, 2,2-bis(4'-hydroxyphenyl)propane, 2,2-bis(4'-β-hydroxyethoxyphenyl)propane, bis(4-hydroxyphenyl)sulfone and bis(4-β-hydroxyethoxyphenyl) sulfonic acid, may, for example, be used. Further, as the copolymerizable component, at least one of monofunctional components including hydroxycarboxylic acids and alkoxycarboxylic acids such as glycolic acid, p-hydroxybenzoic acid and p-β-hydroxyethoxybenzoic acid and stearic acid, stearyl alcohol, benzyl alcohol, benzoic acid, p-butylbenzoic acid and benzoylbenzoic acid, and multi-functional components of tri- or higher function such as trimellitic acid, trimesic acid, pyromellitic acid, trimethylolethane, trimethylolpropane, glycerol and pentaerythritol, may, for example, be used. Among these, e.g. isophthalic acid is preferred as the dicarboxylic acid component, and e.g. diethylene glycol and 1,4-cyclohexanedimethylol are preferred as the diol component. They are used in an amount of preferably at most 10 mol %, more preferably at most 5 mol %, to the total dicarboxylic acid component and the total diol component, respectively.

The method for producing a copolymerized polyester resin of the present invention is basically in accordance with a conventional method for producing a polyester resin from a dicarboxylic acid component containing terephthalic acid or its ester derivative as the main component and a diol component containing ethylene glycol as the main component. Namely, it may be any of a direct polymerization method wherein the dicarboxylic acid component containing terephthalic acid as the main component and the diol component containing ethylene glycol as the main component are objected by esterification in an esterification reaction tank, and the obtained esterification reaction product is transferred to a polycondensation reaction tank for polycondensation; a transesterification method wherein the dicarboxylic acid component containing an ester derivative of terephthalic acid as the main component and the diol component containing ethylene glycole as the main component are objected by transesterification reaction in a transesterification reaction tank, and the obtained transesterification reaction product is transferred to a polycondensation reaction tank for polycondensation; or a continuous direct polymerization method wherein a slurry obtained by dispersing the dicarboxylic acid component containing terephthalic acid as the main component, into the diol component containing ethylene glycole as the main component, in a slurry preparation tank, is continuously added to the esterification reaction product or the transesterification reaction product in the esterification reaction tank obtained as mentioned above, for esterification under normal pressure, and the obtained reaction product is transferred to the polycondensation reaction tank continuously and/or by stages, for polycondensation. Further, the resin obtained by the polycondensation reaction is usually drawn in a form of a strand from a drawing aperture provided at the bottom of the polycondensation reaction tank, and is cut by a cutter during or after cooling with water, to have a form of pellets. When the pellets after the polycondensation are objected by heat treatment for solid state polymerization, a higher degree of polymerization can be obtained, and besides, formation of e.g. acetaldehyde and a low molecular weight oligomer as by-products can be decreased.

In the above-mentioned production method, the esterification reaction is carried out at a temperature of a level of from 200 to 270° C. under a pressure of a level of from 0 to 3 kg/cm² G in the presence of a catalyst for esterification of e.g. an organic acid salt such as diantimony trioxide, antimony, titanium, magnesium or calcium as the case requires, the transesterification reaction is carried out at a temperature of a level of from 200 to 270° C. under a pressure of a level of from 0 to 3 kg/cm²G in the presence of a catalyst for transesterification of e.g. an organic acid salt such as lithium, sodium, potassium, magnesium, calcium, manganese, titanium or zinc as the case requires, and the polycondensation reaction is carried out at a temperature of a level of from 240 to 290° C. under a reduced pressure of a level of from 0.1 to 10 mmHg in the presence of a catalyst for polycondensation of e.g. a metal oxide such as germanium dioxide, germanium tetraoxide or diantimony trioxide, or an organic acid salt such as germanium, antimony, zinc, titanium or cobalt, and a stabilizer such as phosphoric acid, phosphorous acid or an alkyl phosphate. Further, the solid state polymerization is carried out at a temperature of a level of from 180 to 240° C. in an atmosphere of an inert gas such as nitrogen gas and/or under a reduced pressure of a level of from 0.1 to 10 mmHg, after preliminary crystallization is carried out by e.g. heating at a temperature of a level of from 120 to 200° C. for at least 1 minute.

In the method for producing a polyester resin of the present invention, it is essential to add the phenylene dioxydiacetic acid as the copolymerizable component in the dicarboxylic acid component to the reaction system in the form of a solution dissolved in the diol component, whereby excellent color tone will be obtained, and the copolymerization can be carried out stably, and accordingly, production of polyester resins having a stable quality is made possible.

Here, the diol component to be used for dissolution is not particularly limited so long as it is ethylene glycol or another diol component to be used for copolymerization. Preferred is ethylene glycol, and the molar ratio of the diol component for dissolution in the solution to the phenylene dioxydiacetic acid is preferably from 2 to 12, more preferably from 2.5 to 8, particularly preferably from 3.5 to 5, in view of e.g. solubility and fluidity of the solution. The dissolution is carried out at a temperature of preferably a level of from 50 to 180° C.

With respect to the addition of the above-mentioned phenylene dioxydiacetic acid solution to the reaction system, a method of adding said solution to the esterification reaction tank at the initiation of, or during, the esterification reaction or the transesterification reaction, or a method of adding said solution to the esterification reaction product or the transesterification reaction product in the esterification reaction tank, in a transfer pipe through which the product is transferred from the esterification reaction tank to the polycondensation reaction tank, or in the polycondensation reaction tank to which the product is transferred, may, for example, be mentioned. Among these, it is preferred to add the solution to the esterification reaction product or the transesterification reaction product. The solution is added to the reaction system at a temperature of preferably from 30 to 150° C, more preferably from 50 to 100° C.

Particularly preferably, the solution having the phenylene dioxydiacetic acid dissolved in the diol component, is added to the reaction system in the presence of the esterification or transesterification reaction product obtained at any time after the initiation of the esterification or transesterification reaction of the dicarboxylic acid component except for the phenylene dioxydiacetic acid and the diol component, and before the initiation of the polycondensation reaction, after addition of a phosphorus compound as the stabilizer before addition of the catalyst for polycondensation, whereby the formation of the foreign substances can be decreased.

The above-mentioned addition of the solution in the presence of the esterification or transesterification reaction product obtained at any time after the initiation of the esterification or transesterification reaction before the initiation of the polycondensation reaction, specifically represents addition of the solution to the esterification or transesterification rection product immediately after the initiation of the esterification or transesterification reaction, during the esterification or transesterification reaction, or after the completion of the esterification or transesterification reaction, in the esterification reaction tank, in the transfer pipe from the esterification rection tank to the polycondensation reaction tank, or in the polycondensation reaction tank. Among these, it is more preferred to add the solution to the esterification or transesterification reaction product after the completion of the esterification or transesterification reaction in the polycondensation reaction tank to product is transferred.

In the case where the phenylene dioxydiacetic acid solution is added to the esterification reaction tank before or at the initiation of the esterification or transesterification reaction, or to the esterification reaction tank after the completion of the esterification or transesterification reaction before the transfer of the reaction product to the polycondensation reaction tank, the phenylene dioxydiacetic acid is likely to deteriorate by heat, and the obtained polyester resin tends to be poor in color tone.

With respect to the addition of the phenylene dioxydiacetic acid solution after the addition of the phosphorous compound and before the addition of the catalyst for polycondensation, specifically, the solution is added preferably at least 5 minutes, more preferably at least 10 minutes, after the addition of the phosphorous compound, and the catalyst for polycondensation is added preferably at least 5 minutes, more preferably at least 10 minutes, after the addition of the solution. It is preferred to add the phosphorous compound and the catalyst for polycondensation in the form of solutions dissolved in the above-mentioned diol component, preferably in ethylene glycol, respectively.

The phosphorous compound to be used in the present invention may, for example, be phosphoric acid, phosphorous acid, hypophosphorous acid or polyphoshoric acid, or an ester thereof, or a phosphine or a phosphite. The amount is preferably from 20 to 400 ppm, particularly preferably from 40 to 340 ppm, as the phosphorous compound based on the theoretical yield of the polyester resin.

The catalyst for polycondensation to be used in the present invention is as defined above, and the amount is preferably from 10 to 400 ppm, particularly preferably from 30 to 300 ppm, as the compound to be used based on the theoretical yield of the polyester resin.

With respect to the polyester resin obtained by the production method of the present invention, the intrinsic viscosity is usually from 0.55 to 1.5 dl/g, preferably from 0.65 to 1.2 dl/g, particularly preferably from 0.75 to 0.95 dl/g, and the color tone is such that the chromaticity coordinate b value (index of yellow to blue) in Lab system as defined in JIS Z8730, reference 1, is preferably from −3 to +6, more preferably from −2 to +5, particularly preferably from −1 to +4.

Further, with respect to the foreign substances in the polyester resin, the number of visible substances is preferably at most 20, more preferably at most 10, particularly preferably at most 5, in 50 g of the resin. In the present invention, the foreign substances in the polyester resin are considered to be generated in such a manner that part of the catalyst component or stabilizer component reacts or aggregates in the resin production step, or part of the reaction product becomes to have a high melting point for some reason, to be grown to have a visible size.

With respect to the polyester resin obtained by the production method of the present invention, a preform obtained by injection molding is objected by stretch blow molding, or a parison obtained by extrusion molding is objected by blow molding, to be molded into e.g. bottles, or a sheet obtained by extrusion molding is objected by thermoforming to be molded into e.g. trays and containers, or said sheet is objected by biaxial stretching to obtain e.g. films, and the polyester resin of the present invention becomes useful particularly in a food packaging field.

Particularly, the polyester resin is suitable to obtain bottles by blow molding such as cold parison method wherein biaxial stretching of the preform obtained by injection molding is carried out after reheating, and the bottles are suitably used as containers for drinks such as carbonated drinks, fruit juice, alcohol drinks, tea and mineral water, and for liquid flavorings such as soy sauce, Worcester sauce, Sweet sake and dressing.

Now, the present invention will be explained in further detail with reference to Examples. However, it should be understood that the present invention is by no means restricted such specific Examples.

The starting material phenylene dioxydiacetic acid (hereinafter referred to as PDDA) used in Examples and Comparative Examples are shown below.

Production Example 1 for Starting Material PDDA 100 kg (0.908 kM) of resorcinol and 490 kg of deionized water were introduced into a reaction tank followed by dissolution, a 47% aqueous NaOH solution was added thereto to adjust the pH to 8.7, and the temperature was adjusted to 95° C. Then, an aqueous solution having 228 kg (2.41 kM) of monochloroacetic acid (molar ratio of monochloroacetic acid to resorcinol: 2.65) dissolved in 148 kg of deionized water with stirring, was droprise added thereto over a period of 5 hours, while keeping the pH 8.7 by droprise adding the above-mentioned aqueous NaOH solution continuously. After the completion of the droprise addition, the reaction was continued further for 2 hours while keeping the pH 8.7. The obtained PDDA alkali salt solution was droprise added to an aqueous solution of 309 kg of 50% sulfuric acid in 447 kg of deionized water with stirring, and the precipitated crystal was objected by solid-liquid separation by centrifugal separation to obtain a wet cake of PDDA, and this wet cake was once purified by recrystallization with water, followed by solid-liquid separation, and dried under reduced pressure at 60° C., to obtain a starting material PDDA. The composition of the obtained starting material PDDA was analyzed by the following method. The PDDA was 1,3-phenylene dioxydiacetic acid with 0.08 wt % of 2-(3-hydroxyphenoxy)acetic acid as a monohydroxyphenylene oxyacetic acid, and with 0.51 wt % of 4-carboxymethyl-1,3-phenylenebis(2-oxyacetic acid) as a phenylene dioxydiacetic acid. Further, the transmittance of light having a wavelength of 400 nm was 94.1 %.

Compositional Analysis of Starting Material PDDA

The analysis was carried out by using high performance liquid chromatography under the following conditions:

Column: MCI gel ODS-1HU 5 μm 46 mmΦ×250 mm (Manufactured by Mitsubishi Chemical Corporation)

Mobile phase: methanol/water/85% phosphoric acid with a volume ratio of 30/70/0.15+$Na_2SO_4$=2 g/l Limit of detection: 254 nm Measurement temperature: 40° C.

Quantitative determination: internal standard method (internal standard: benzoic acid)

Transmittance of Light 5 g of the starting material PDDA was weighed in a 50 ml volumetric flask, 25 ml of a 2N-NaOH aqueous solution was added thereto for dissolution, and distilled water was added thereto to the index mark, followed by mixing to prepare a solution. The solution was put in a quartz cell with a light path length of 10 mm, and a transmittance of light having a wavelength of 400 nm was measured by means of a spectrophotometer (UV-2200 manufactured by Shimadzu Corp.).

EXAMPLE 1

50.5 kg (260 mol) of dimethylterephthalate and 32.3 kg (520 mol) of ethylene glycol were introduced into an esterification reaction tank followed by dissolution, manganese acetate dissolved in ethylene glycol was added thereto in an amount of 100 ppm as manganese atoms to the theoretical yields of the polyester resin, and transesterification reaction was carried out while distilling off the produced methanol at a temperature of about 220° C. Then, a slurry prepared from 43.2 kg (260 mol) of terephthalic acid and 19.4 kg (312 mol) of ethylene glycol in a slurry preparation tank was continuously transferred to said esterification reaction tank over a period of 3 hours, to carry out esterification reaction at a temperature of about 250° C., and 4 hours after the transfer, 50% of the reaction solution was transferred to a polycondensation reaction tank.

On the other hand, 9.05 kg (40 mol) of 1,3-phenylene dioxydiacetic acid obtained in Production Example 1 and 9.93 kg (160 mol) of ethylene glycol were dissolved in a dissolution tank at about 110° C. with stirring, to prepare a solution (molar ratio of ethylene glycol to 1,3-phenylene dioxydiacetic acid: 4).

Then, to the above-mentioned polycondensation reaction tank having the esterification reaction product transferred thereto, as a stabilizer, phosphoric acid dissolved in ethylene glycol was added in an amount of 180 ppm based on the theoretical yield of the polyester resin. After 10 minutes, 3.82 kg (out of this, 1,3-phenylene dioxydiacetic acid was 1.82 kg, corresponding to 3 mol % based on the total dicarboxylic acid component) of the above-mentioned solution was transferred thereto at about 80° C. over a period of 10 minutes. Then, after 10 minutes, as catalysts for polycondensation, diantimony trioxide dissolved in ethylene glycol in an amount of 300 ppm based on the theoretical yield of the polyester resin, and cobalt acetate dissolved in ethylene glycol in an amount of 90 ppm based on the theoretical yield of the polyester resin, were added thereto. Then, while raising the temperature from about 250° C. to about 270° C. over a period of about 100 minutes and reducing the pressure from nomal pressure to 1 mmHg, polycondensation reaction was carried out for 3 hours after the initiation of the pressure reduction, while distilling off ethylene glycol. The reaction product was drawn in a form of a strand, from a drawing aperture provided at the bottom of the polycondensation reaction tank, and the strand was cooled with water and formed into pellets by a cutter, to produce a copolymerized polyester resin. With respect to the obtained copolymerized polyester resin, the content of 1,3-phenylene dioxydiacetic acid, the intrinsic viscosity, the color tone, the heat resistance and the content of foreign substances were measured by the following methods, and the results are shown in Table 1 (in Table, 1,3-phenylene dioxydiacetic acid will be referred to simply as PDDA).

Content of 1,3-Phenylene Dioxydiacetic Acid

A resin solution sample was analyzed by means of nuclear magnetic resonance (NMR) by monitoring 1H, and the mol % of 1,3-phenylene dioxydiacetic acid based on the total carboxylic acid component was obtained.

Intrinsic viscosity

About 0.25 g of a resin sample was dissolved in an amount of 1.0 wt % in about 25 ml of a mixed solvent of phenol and 1,1,2,2-tetrachloroethane with a weight ratio of 1 to 1) at 110° C., and then the mixture was cooled to 30° C., and the intrinsic viscosity was measured by means of an automatic solution viscometer (2CH Model DJ 504 manufactured by Chuo Rika).

Color Tone

A resin sample was filled in a cylindrical cell for measuring powder color, having a diameter of the bottom of about 30 mm and a height of about 12 mm, and the chromaticity coordinate b value in Lab system as defined in JIS Z8730, reference 1, was obtained as the simple average value of values measured by means of a color-difference meter (ND-300A manufactured by NIPPON DENSHOKU KOGYO) with respect to 4 points, with rotating the cell by about 90 degree, by reflection method.

Heat Resistance

About 30 g of a resin sample was put in a glass test tube and dried under a high vacuum of at most 0.5 mmHg at 160° C. for 2 hours, and held in the form of a melt in a nitrogen atmosphere at 290° C. for 3.5 hours, to carry out heat treatment. The intrinsic viscosity of the resin after the heat treatment was measured, to calculate the retention of the intrinsic viscosity after the heat treatment.

Content of Foreign Substances 50 g of a resin sample was uniformly spread on a see-through stand with a bottom light source so that the resins were not overlaid one on another, and the number of the foreign substances contained was counted by visual observation by means of a magnifier with 10× magnification.

The same operation as mentioned above was carried out further for 3 times, to produce totally 4 polyester resins under the same condition. With respect to these resins, the content of 1,3-phenylene dioxydiacetic acid, the intrinsic viscosity and the color tone were measured by the above-mentioned methods, and the results are shown in Table 1.

Further, the four resins obtained by the above-mentioned polycondensation were blended with one another, followed by solid state polymerization at a temperature of 205° C. under a reduced pressure of at most 1 mmHg for 20 hours. The obtained resin had an intrinsic viscosity of 0.81 dl/g.

EXAMPLE 2

A copolymerized polyester resin was produced in the same manner as in Example 1, except that 9.05 kg (40 mol) of 1,3-phenylene dioxydiacetic acid obtained in Production Example 1 and 19.9 kg (320 mol) of ethylene glycol were used to prepare the solution (molar ratio of ethylene glycol to 1,3-phenylene dioxydiacetic acid: 8), and 5.81 kg of said solution (out of this, 1,3-phenylene dioxydiacetic acid was 1.82 kg, corresponding to 3 mol % based on the total dicarboxylic acid component) was transferred to the polycondensation reaction tank. The content of 1,3-phenylene dioxydiacetic acid, the intrinsic viscosity, the color tone, the heat resistance and the content of foreign substances were measured in the same manner as in Example 1, and the results are shown in Table 1.

Further, in the same manner as in Example 1, the operation was repeated further for 3 times, to produce totally 4 polyester resins under the same condition, and with respect to these resins, the content of 1,3-phenylene dioxydiacetic acid, the intrinsic viscosity and the color tone were measured, and the results are shown in Table 1.

Further, the resin objected by solid state polymerization in the same manner as in Example 1, had an intrinsic viscosity of 0.81 dl/g.

EXAMPLE 3

A copolymerized polyester resin was produced in the same manner as in Example 1, except that 9.05 kg (40 mol) of 1,3-phenylene dioxydiacetic acid obtained in 20 Production Example 1 and 29.8 kg (480 mol) of ethylene glycol were used to prepare the solution (molar ratio of ethylene glycol to 1,3-phenylene dioxydiacetic acid: 12), and 7.81 kg of said solution (out of this, 1,3-phenylene dioxydiacetic acid was 1.82 kg, corresponding to 3 mol % based on the total dicarboxylic acid component) was transferred to the polycondensation reaction tank. The content of 1,3-phenylene dioxydiacetic acid, the intrinsic viscosity, the color tone, the heat resistance and the content of foreign substances were measured in the same manner as in Example 1, and the results are shown in Table 1.

Further, in the same manner as in Example 1, the operation was repeated further for 3 times, to produce totally 4 polyester resins under the same condition, and with respect to these resins, the content of 1,3-phenylene dioxydiacetic acid, the intrinsic viscosity and the color tone were measured, and the results are shown in Table 1.

Further, the resin objected by solid state polymerization in the same manner as in Example 1, had an intrinsic viscosity of 0.80 dl/g.

EXAMPLE 4

A copolymerized polyester resin was produced in the same manner as in Example 1 except that the ethylene glycol solution of 1,3-phenylene dioxydiacetic acid obtained in Production Example 1, was transferred to the polycondensation reaction tank at a temperature of about 40° C., and the content of 1,3-phenylene dioxydiacetic acid, the intrinsic viscosity, the color tone, the heat resistance and the content of foreign substances were measured in a same manner, and the results are shown in Table 1. The solution had a slightly high viscosity, and the load on the transfer pump was slightly high.

Further, in the same manner as in Example 1, the operation was repeated further for 3 times to produce totally 4 polyester resins under the same condition, and with respect to these resins, the content of 1,3-phenylene dioxydiacetic acid, the intrinsic viscosity and the color tone were measured, and the results are shown in Table 1.

Further, the resin objected by solid state polymerization in the same manner as in Example 1, had an intrinsic viscosity of 0.81 dl/g.

Comparative Example 1

A copolymerized polyester resin was produced in the same manner as in Example 1, except that a slurry was prepared from 1.82 kg (8 mol) of 1,3-phenylene dioxydiacetic acid and 3.99 kg (64 mol) of ethylene glycol (molar ratio of ethylene glycol to 1,3-phenylene dioxydiacetic acid. 8) instead of dissolving 1,3-phenylene dioxydiacetic acid in ethylene glycol, said slurry was transferred to the esterification reaction tank when the slurry of terephthalic acid in ethylene glycol was transferred to the tank (1,3-phenylene dioxydiacetic acid was 3 mol % based on the total dicarboxylic acid component), and the catalysts for polycondensation and the stabilizer were added immediately after the esterification reaction product was transferred to the polycondensation reaction tank to initiate the polycondensation reaction. The content of 1,3-phenylene dioxydiacetic acid, the intrinsic viscosity, the color tone, the heat resistance and the content of foreign substances were measured in the same manner, and the results are shown in Table 1.

Further, in the same manner as in Example 1, the operation was repeated further for 3 times, to produce totally 4 polyester resins under the same condition, and with respect to these polyester resins, the content of 1,3-phenylene dioxydiacetic acid, the intrinsic viscosity and the color tone were measured, and the results are shown in Table 1.

Comparative Example 2

A copolymerized polyester resin was produced in the same manner as in Example 1, except that a slurry was prepared from 1.82 kg (8 mol) of 1,3-phenylene dioxydiacetic acid obtained in Production Example 1 and 3.99 kg (64 mol) of ethylene glycol (molar ratio of ethylene glycol to 1,3-phenylene dioxydiacetic acid: 8) instead of dissolving 1,3-phenylene dioxydiacetic acid in ethylene glycol, said slurry was transferred to the polycondensation reaction tank having the esterification reaction product transferred thereto (1,3-phenylene dioxydiacetic acid was 3 mol % based on the total dicarboxylic acid component), and the catalysts for polycondensation and the stabilizer were added immediately after said slurry was transferred to the polycondensation reaction tank to initiate the polycondensation reaction. The content of 1,3-phenylene dioxydiacetic acid, the intrinsic viscosity, the color tone, the heat resistance and the content of foreign substances were measured in the same manner, and the results are shown in Table 1.

Further, in the same manner as in Example 1, the operation was repeated further for 3 times, to produce totally 4 polyester resins under the same condition, and with respect to these polyester resins, the content of 1,3-phenylene dioxydiacetic acid, the intrinsic viscosity and the color tone were measured, and the results are shown in Table 1.

Comparitive Example 3

A copolymerized polyester resin was produced in the same manner as in Example 1, except that 1.82 kg (8 mol) of 1,3-phenylene dioxydiacetic acid obtained in Production Example 1 was fused in a melting tank at a temperature of about 220°C, the melt was transferred to the esterification reaction tank when the slurry of terephthalic acid in ethylene glycol was transferred to the esterification reaction tank (1,3-phenylene dioxydiacetic acid was 3 mol % based on the total dicarboxylic acid component), and the catalysts for polycondensation and the stabilizer were added immediately after the esterification reaction product was transferred to the polycondensation reaction tank to initiate the polycondensation reaction. The content of 1,3-phenylene dioxydiacetic acid, the intrinsic viscosity, the color tone, the heat resistance and the content of foreign substances were measured in the same manner, and the results are shown in Table 1.

Further, in the same manner as in Example 1, the operation was repeated further for 3 times, to produce totally 4 polyester resins under the same condition, and with respect to these polyester resins, the content of 1,3-phenylene dioxydiacetic acid, the intrinsic viscosity and the color tone were measured, and the results are shown in Table 1.

TABLE 1

|       |      |           | PDDA content (mol %) | Intrinsic Viscosity (dl/g) | b Value | Retension of intrinsic viscosity after heat treatment (%) | Content of foreign substance (number/50 g) |
|-------|------|-----------|----------------------|----------------------------|---------|-----------------------------------------------------------|--------------------------------------------|
| Ex. 1 | 1st. | Pro-      | 3.0                  | 0.633                      | +3.1    | 85.0                                                      | 10                                         |
|       | 2nd. | duction   | 3.1                  | 0.630                      | +3.9    | —                                                         | —                                          |
|       | 3rd. |           | 3.0                  | 0.624                      | +4.2    | —                                                         | —                                          |
|       | 4th. |           | 3.0                  | 0.637                      | +3.8    | —                                                         | —                                          |
| Ex. 2 | 1st. | Pro-      | 3.1                  | 0.628                      | +3.0    | 84.3                                                      | 12                                         |
|       | 2nd. | duction   | 3.0                  | 0.624                      | +3.7    | —                                                         | —                                          |
|       | 3rd. |           | 3.0                  | 0.613                      | +3.5    | —                                                         | —                                          |
|       | 4th. |           | 3.1                  | 0.619                      | +4.1    | —                                                         | —                                          |
| Ex. 3 | 1st. | Pro-      | 3.0                  | 0.615                      | +3.1    | 83.1                                                      | 12                                         |
|       | 2nd. | duction   | 3.0                  | 0.597                      | +3.9    | —                                                         | —                                          |
|       | 3rd. |           | 3.1                  | 0.608                      | +4.0    | —                                                         | —                                          |
|       | 4th. |           | 3.0                  | 0.612                      | +3.7    | —                                                         | —                                          |
| Ex. 4 | 1st. | Pro-      | 2.9                  | 0.631                      | +2.8    | 84.8                                                      | 11                                         |
|       | 2nd. | duction   | 3.0                  | 0.623                      | +3.1    | —                                                         | —                                          |
|       | 3rd. |           | 3.0                  | 0.629                      | +3.8    | —                                                         | —                                          |
|       | 4th. |           | 2.9                  | 0.638                      | +3.5    | —                                                         | —                                          |
| Comp. Ex. 1 | 1st. | Pro-  | 2.4                  | 0.641                      | +4.2    | 73.0                                                      | 47                                         |
|       | 2nd. | duction   | 2.5                  | 0.640                      | +5.6    | —                                                         | —                                          |
|       | 3rd. |           | 2.8                  | 0.652                      | +6.4    | —                                                         | —                                          |
|       | 4th. |           | 2.6                  | 0.649                      | +7.7    | —                                                         | —                                          |

TABLE 1-continued

|  |  |  | PDDA content (mol %) | Intrinsic Viscosity (dl/g) | b Value | Retension of intrinsic viscosity after heat treatment (%) | Content of foreign substance (number/50 g) |
|---|---|---|---|---|---|---|---|
| Comp. Ex. 2 | 1st. | Production | 2.6 | 0.572 | +3.3 | 76.2 | 52 |
|  | 2nd. |  | 2.9 | 0.580 | +4.2 | — | — |
|  | 3rd. |  | 2.7 | 0.601 | +4.6 | — | — |
|  | 4th. |  | 2.8 | 0.595 | +4.3 | — | — |
| Comp. Ex. 3 | 1st. | Production | 3.0 | 0.582 | +8.2 | 71.0 | 50 |
|  | 2nd. |  | 2.8 | 0.568 | +10.0 | — | — |
|  | 3rd. |  | 2.7 | 0.542 | +11.8 | — | — |
|  | 4th. |  | 2.8 | 0.550 | +13.6 | — | — |

According to the present invention, a method for producing a copolymerized polyester resin can be provided, in which a copolymerization of a dicarboxylic acid component to impart gas barrier properties can be carried out stably, whereby a polyester resin having a stable quality, in addition to excellent color tone, can be produced. Further, according to the present invention, a method for producing a copolymerized polyester resin, which has the above-mentioned effect, in addition, which may not decrease the heat resistance, can be provided. Further, according to the present invention, a method for producing a copolymerized polyester resin, which has the above-mentioned effects, in addition, which will reduce the formation of foreign substances, can be provided.

What is claimed is:

1. A method for producing a copolymerized polyester resin, which comprises subjecting a dicarboxylic acid component containing terephthalic acid or its ester derivative as the main component and a phenylene dioxydiacetic acid as a copolymerizable component, and a diol component containing ethylene glycol as the main component, to polycondensation through an esterification reaction or a transesterification reaction, wherein the phenylene dioxydiacetic acid is added to the reaction system in the form of a solution dissolved in the diol component.

2. The method for producing a copolymerized polyester resin according to claim 1, wherein the solution having the phenylene dioxydiacetic acid dissolved in the diol component, has a molar ratio of the diol component to the phenylene dioxydiacetic acid of from 2 to 12.

3. The method for producing a copolymerized polyester resin according to claim 1, wherein the solution having the phenylene dioxydiacetic acid dissolved in the diol component is added to the reaction system at a temperature of from 30 to 150° C.

4. The method for producing a copolymerized polyester resin according to claim 1, wherein the proportion of the phenylene dioxydiacetic acid is from 0.1 to 20 mol % based on the total dicarboxylic acid component.

5. The method for producing a copolymerized polyester resin according to claim 1, wherein the diol component in the solution having the phenylene dioxydiacetic acid dissolved therein, is ethylene glycol.

6. The method for producing a copolymerized polyester resin according to claim 1, wherein the phenylene dioxydiacetic acid is 1,3-phenylene dioxydiacetic acid.

7. The method for producing a copolymerized polyester resin according to claim 1, wherein the phenylene dioxydiacetic acid to be used as the starting material has a content of monohydroxyphenylene oxyacetic acid of at most 0.2 wt %, a content of phenylene dioxytriacetic acid of at most 1.0 wt %, and a transmittance of light having a wavelength of 400 nm of at least 90 % as a 10 wt % aqueous alkali solution.

8. The method for producing a copolymerized polyester resin according to claim 1, wherein the solution having the phenylene dioxydiacetic acid dissolved in the diol component, is added to the reaction system in the presence of an esterification reaction product or a transesterification reaction product obtained at any time from the initiation of the esterification reaction or the transesterification reaction of the dicarboxylic acid component except for the phenylene dioxydiacetic acid, containing terephthalic acid or its ester derivative as the main component, and the diol component containing ethylene glycol as the main component, before the initiation of the polycondensation reaction, at an optional stage after addition of a phosphorous compound as a stabilizer before addition of a catalyst for polycondensation.

9. The method for producing a copolymerized polyester resin according to claim 8, wherein the proportion of the phenylene dioxydiacetic acid is from 0.1 to 20 mol % based on the total dicarboxylic acid component.

10. The method for producing a copolymerized polyester resin according to claim 8, wherein the phenylene dioxydiacetic acid is 1,3-phenylene dioxydiacetic acid.

11. The method for producing a copolymerized polyester resin according to claim 8, wherein the phenylene dioxydiacetic acid to be used as the starting material has a content of monohydroxyphenylene oxyacetic acid of at most 0.2 wt %, a content of phenylene dioxytriacetic acid of at most 1.0 wt %, and a transmittance of light having a wavelength of 400 nm of at least 90 % as a 10 wt % aqueous alkali solution.

* * * * *